(12) United States Patent
Chang et al.

(10) Patent No.: US 12,737,506 B2
(45) Date of Patent: Sep. 15, 2026

(54) ANTI-TAMPER DEVICE

(71) Applicants: Sercomm Corporation, Taipei City (TW); Sernet (Suzhou) Technologies Corporation, Jiangsu (CN)

(72) Inventors: Chin-Tan Chang, Taipei City (TW); Heng Lu, Jiangsu Province (CN)

(73) Assignees: SERCOMM CORPORATION, Taipei City (TW); SERNET (SUZHOU) TECHNOLOGIES CORPORATION, Jiangsu (CN)

( * ) Notice: Subject to any disclaimer, the term of this patent is extended or adjusted under 35 U.S.C. 154(b) by 0 days.

(21) Appl. No.: 19/234,576

(22) Filed: Jun. 11, 2025

(65) Prior Publication Data

US 2026/0017416 A1 Jan. 15, 2026

(30) Foreign Application Priority Data

Jul. 10, 2024 (CN) ......................... 202410927230.6

(51) Int. Cl.
*G06F 21/88* (2013.01)

(52) U.S. Cl.
CPC .................................... *G06F 21/88* (2013.01)

(58) Field of Classification Search
CPC ....................................................... G06F 21/88
See application file for complete search history.

(56) References Cited

U.S. PATENT DOCUMENTS 6,828,692 B2 * 12/2004 Simon ..................... B60R 25/04 340/5.5
8,250,887 B2 * 8/2012 MacKay .................. G07F 9/06 70/120
9,298,956 B2 * 3/2016 Wade .................. G06K 7/0095
9,750,148 B1 8/2017 Huang
9,945,017 B2 * 4/2018 Waniuk ................... C22C 45/00
11,087,301 B1 * 8/2021 Razaghi .................. G07F 7/088
2005/0134438 A1 * 6/2005 Simon ................ G07C 9/00658 340/5.4
2014/0297540 A1 * 10/2014 Swamy ............. G06Q 20/4016 235/440

(Continued)

FOREIGN PATENT DOCUMENTS

CN 209561790 U 10/2019

*Primary Examiner* — Amine Benlagsir
(74) *Attorney, Agent, or Firm* — McClure, Qualey & Rodack, LLP

(57) ABSTRACT

An anti-tamper device includes a top component, a reciprocating component, a bottom component, a rotatable rod, a movable sleeve, and a circuit element. The top component has a first guide portion and a second guide portion. The reciprocating component can reciprocate between a first position and a second position. The bottom component has a fixing rod corresponding to the second guide portion. The rotatable rod is pivotally connected to the fixing rod. When the movable sleeve partially sheathes both on the rotatable rod and the fixing rod, and the top component correspondingly is engaged with the bottom component, the rotatable rod is movably engaged with the second guide portion to drive the reciprocating component moving to the first position, so as to trigger the circuit element generating an electronic signal, and to drive the second guide portion pushing the movable sleeve to completely sheath on the fixing rod.

10 Claims, 6 Drawing Sheets

(56) References Cited

U.S. PATENT DOCUMENTS

| | | | | |
|---|---|---|---|---|
| 2015/0357258 | A1* | 12/2015 | Fitzgerald | H10W 40/037 257/713 |
| 2016/0026836 | A1* | 1/2016 | Bousfield | G07C 9/29 340/10.1 |
| 2018/0112362 | A1* | 4/2018 | Breisch | E01B 27/14 |
| 2018/0276421 | A1* | 9/2018 | Sion | G06F 21/602 |
| 2022/0035959 | A1* | 2/2022 | Mobley | G06F 21/86 |
| 2024/0133216 | A1* | 4/2024 | Anand | B65D 63/1027 |

* cited by examiner

101 { 101a, 101b, 101e, 101F, 101O, 101T }

102 { 102a, 102b, 102c, 102p }

104 { 104a, 104b, 104L }

200

ANTI-TAMPER DEVICE

This application claims the benefit of People's Republic of China applications Serial No. 202410927230.6 filed Jul. 10, 2024, and the subject matter of which is incorporated herein by reference.

BACKGROUND OF THE DISCLOSURE

Field of the Disclosure

The present invention relates to an electronic device structure, and particularly to an anti-tamper device used to prevent an electronic device from being tampered with or to prevent the internal information stored in the electronic device from being read with unauthorized disassembly.

Description of the Related Art

With the rapid development of electronic technology, users are paying more and more attention to the safety requirements of electronic products. In order to prevent unauthorized disassembly and tampering of electronic products or reading of unauthorized reading of the internal information stored in the electronic products, anti-tamper devices are usually configured within the electronic products/systems or its peripheral devices when the electronic products/systems are first assembled. When unauthorized disassembly of the electronic products/system occurs, it may render the electronic products/system unable to be reassembled or operate normally, and at the same time, leave traces of disassembly, so that the owner of the electronic products/system can realize that the electronic products/system have been disassembled without authorization.

However, the prior art anti-tamper devices generally just applying hardware anti-tampering design, and their anti-tampering capabilities are insufficient, which are easily cracked and reassembled without a trace. Such that, the owner of the electronic product cannot be aware of that the electronic product has been disassembled, tampered with, or read without authorization in real time, thus losing the purpose of anti-tampering.

Therefore, there is a need to provide an advanced anti-tamper device and an assembly method thereof to solve the problems faced by the prior art.

SUMMARY OF THE DISCLOSURE

One embodiment of the present disclosure is to provide an anti-tamper device, wherein the anti-tamper device includes a top component, a reciprocating component, a bottom component, a rotatable rod, a movable sleeve, and a circuit element. The top component has a first guide portion and a second guide portion. The reciprocating component can reciprocate between a first position and a second position. The bottom component has a fixing rod corresponding to the second guide portion. The rotatable rod is pivotally connected to the fixing rod. When the movable sleeve partially sheathes both on the rotatable rod and the fixing rod, and the top component correspondingly is engaged with the bottom component, the rotatable rod is movably engaged with the second guide portion to drive the reciprocating component moving to the first position, so as to trigger the circuit element generating an electronic signal, and to drive the second guide portion pushing the movable sleeve to completely sheath on the fixing rod. When the top component is disassembled and detached from the bottom component, the rotatable rod can be driven to rotate and to form a non-straight angle (non-180°) with the fixing rod, and no longer drives the reciprocating component to move, so as to keep the reciprocating component at the second position.

Another embodiment of the present disclosure is to provide an assembling method of an anti-tamper device, wherein the assembling method includes steps as follows: Firstly, an anti-tamper device is provided, wherein the anti-tamper device includes a top component, a reciprocating component, a bottom component, a rotatable rod, a movable sleeve, and a circuit element. The top component has a first guide portion and a second guide portion. The reciprocating component can reciprocate between a first position and a second position. The bottom component has a fixing rod corresponding to the second guide portion. The rotatable rod is pivotally connected to the fixing rod. Then the top component is correspondingly engaged with the bottom component, which includes the following steps: Firstly, the movable sleeve partially sheathes both on the fixing rod and the rotatable rod. The rotatable rod is then movably engaged to the second guide portion to make the rotatable rod driving the reciprocating component to move to the first position to trigger the circuit element generating an electronic signal; and to make the second guide portion pushing the movable sleeve to completely sheath on the fixing rod. When the top component is disassembled and detached from the bottom component, the rotatable rod is driven to rotate and form a non-straight angle (non-180°) with the fixing rod, and no longer drives the reciprocating component to move, so as to keep the reciprocating component at the second position.

According to one embodiment of the present disclosure, an anti-tamper device and an assembly method thereof are provided, wherein the anti-tamper device includes a top component, a reciprocating component, a bottom component, a rotatable rod, a movable sleeve, and a circuit element. The top component has a first guide portion and a second guide portion. The bottom component includes a fixing rod. The rotatable rod is pivotally connected to the fixing rod. Before the top component is correspondingly engaged with the bottom component, the movable sleeve is first mounted both on the rotatable rod and the fixing rod to make the rotatable rod and the fixing rod coaxial. The rotatable rod is then movably engaged with the second guide portion of the upper component, to make the rotatable rod driving the reciprocating component moving to the first position and to trigger the circuit element generating an electronic signal. At this time, the movable sleeve is separate from the rotatable rod, due to the push of the second guiding portion, and completely sheathes on the fixing rod.

When the top component and the bottom component are disassembled and detached from each other, the rotatable rod is detached from the second guide portion. Since the rotatable rod is no longer restrained by the movable sleeve, thus it may rotate, due to gravity, and form a non-straight angle with the fixing rod. At this time, the rotatable rod no longer pushes the reciprocating component and trigger the circuit element to generate electronic signal. Meanwhile, the circuit element can generate an alarm signal to notify the owner of the electronic product/system that there occurs an unauthorized disassembly in real time. Because, reassembly of the anti-tamper device must be performed by professionals who understand the internal design of the anti-tamper device following a specific instructions of the professionals, it can ensure the electronic product/system not being disassembled, tampered with or read without authorization.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides an anti-tamper device and an assembly method thereof, which can notify the owner of the electronic product/system using the anti-tamper device in real time, and ensure the electronic product/system not being disassembled, tampered with or read without authorization. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1A:
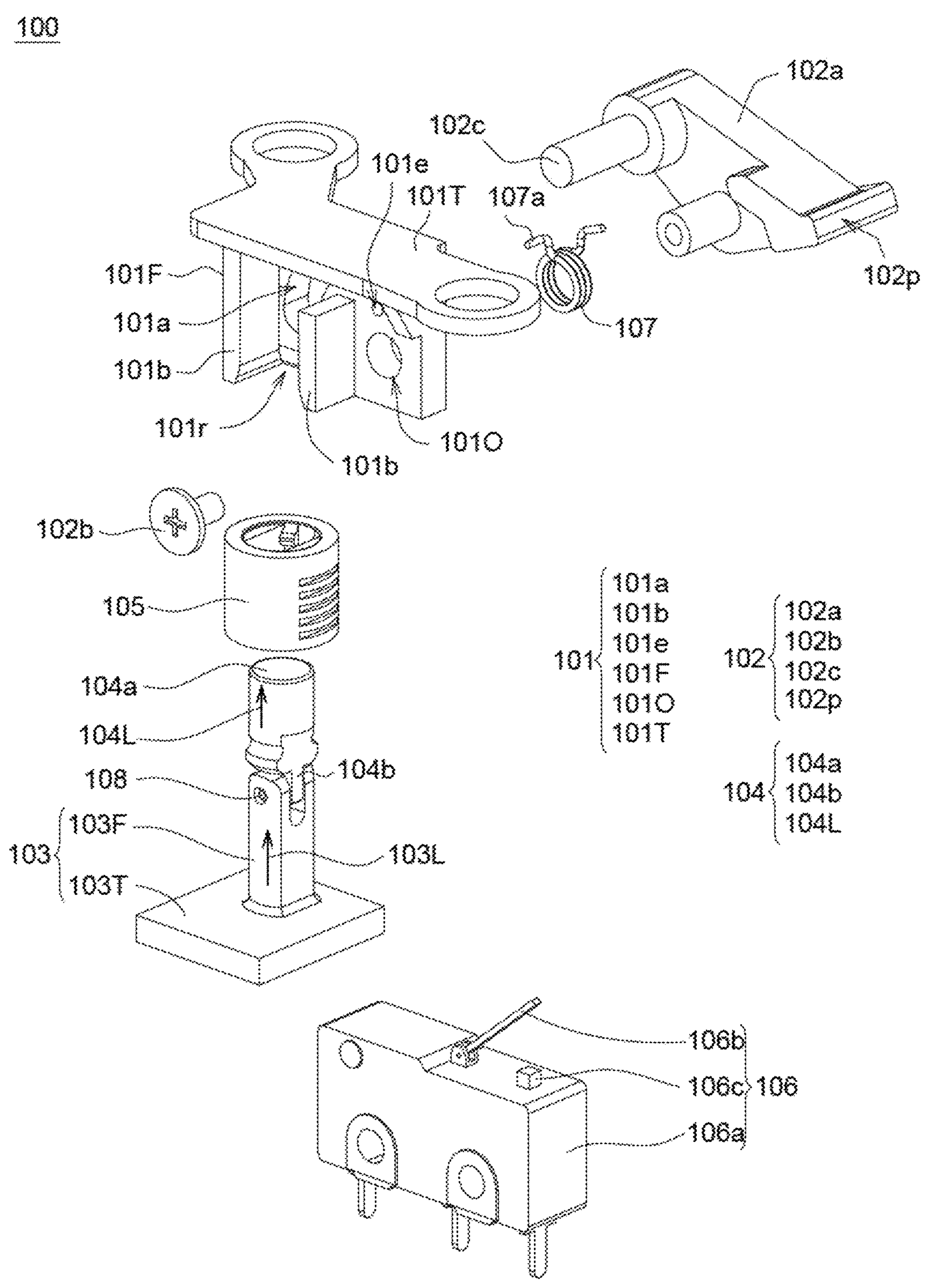
FIG. 1A is perspective view illustrating the partial and exploded structure of an anti-tamper device according to one embodiment of the present disclosure.
Figure 1B:
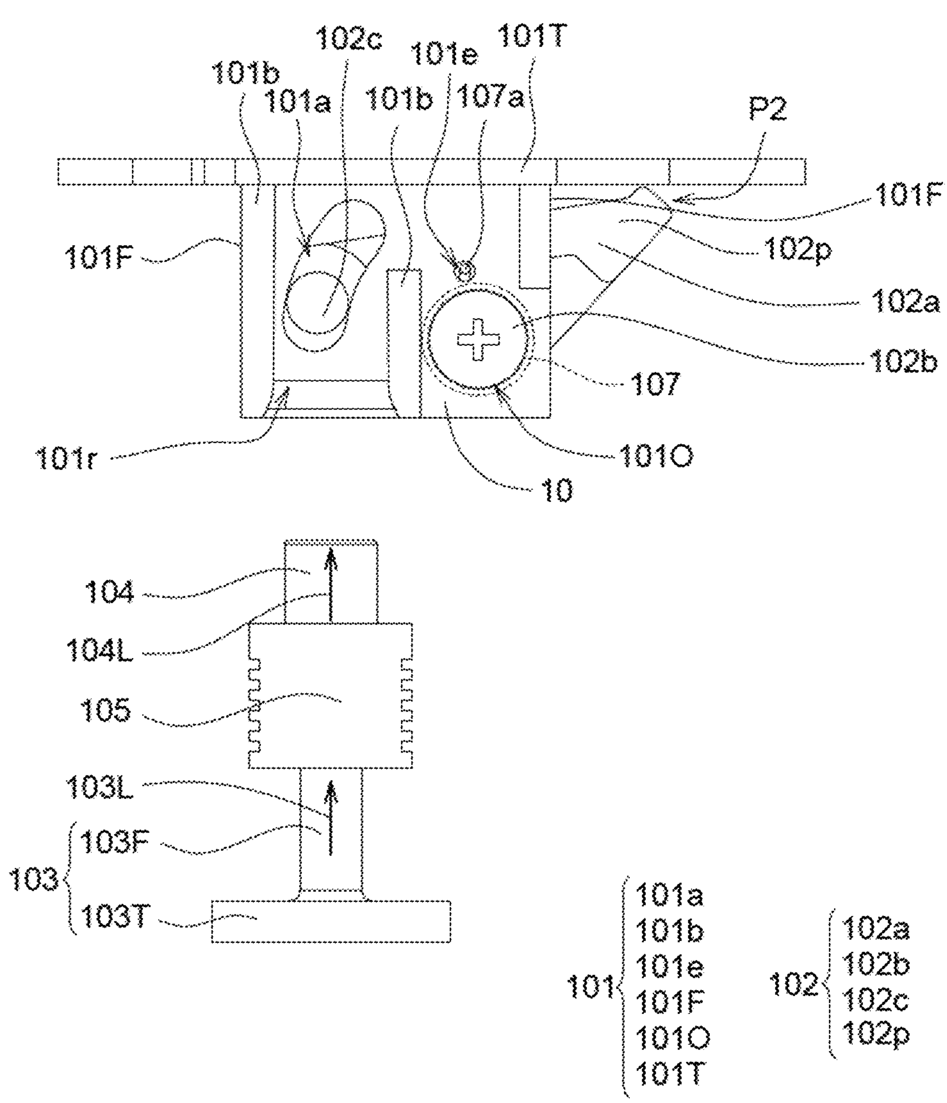
FIG. 1B is a side view of the anti-tamper device as depicted in FIG. 1A at the pre-assembly state (in which the circuit elements are omitted)
Figure 1C:
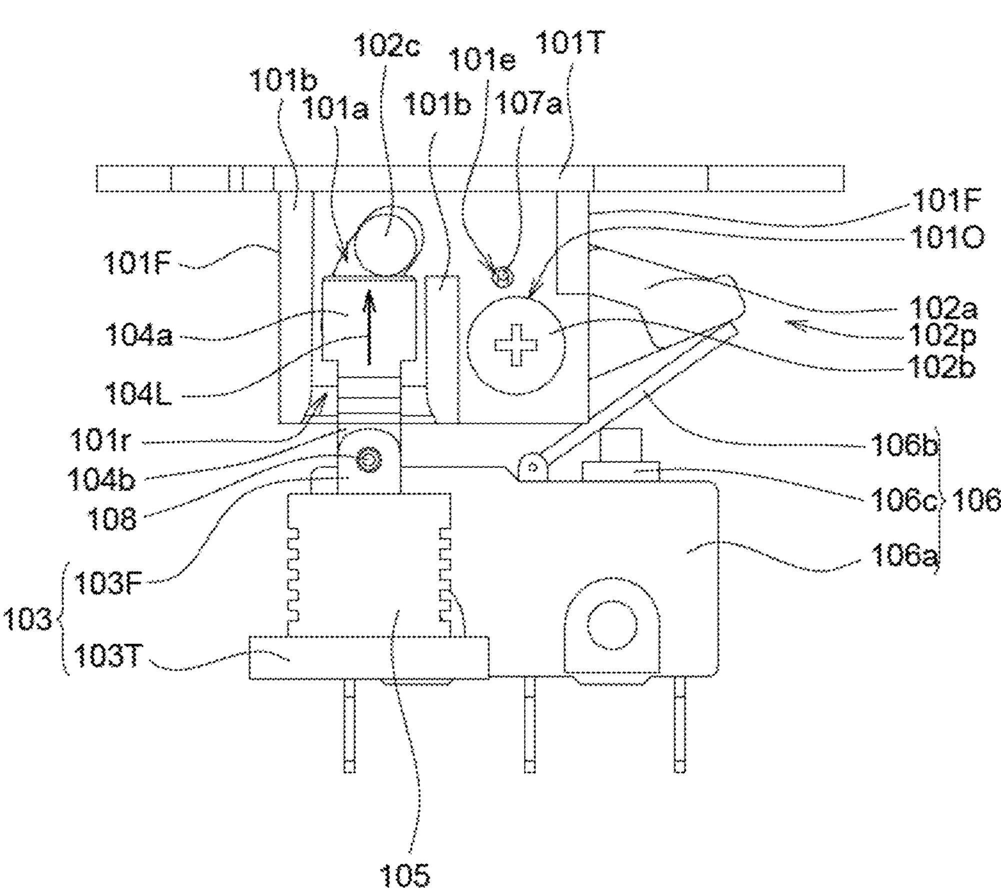
FIG. 1C is a side view of the anti-tamper device as depicted in FIG. 1A at the complete assembly state.
Figure 1D:
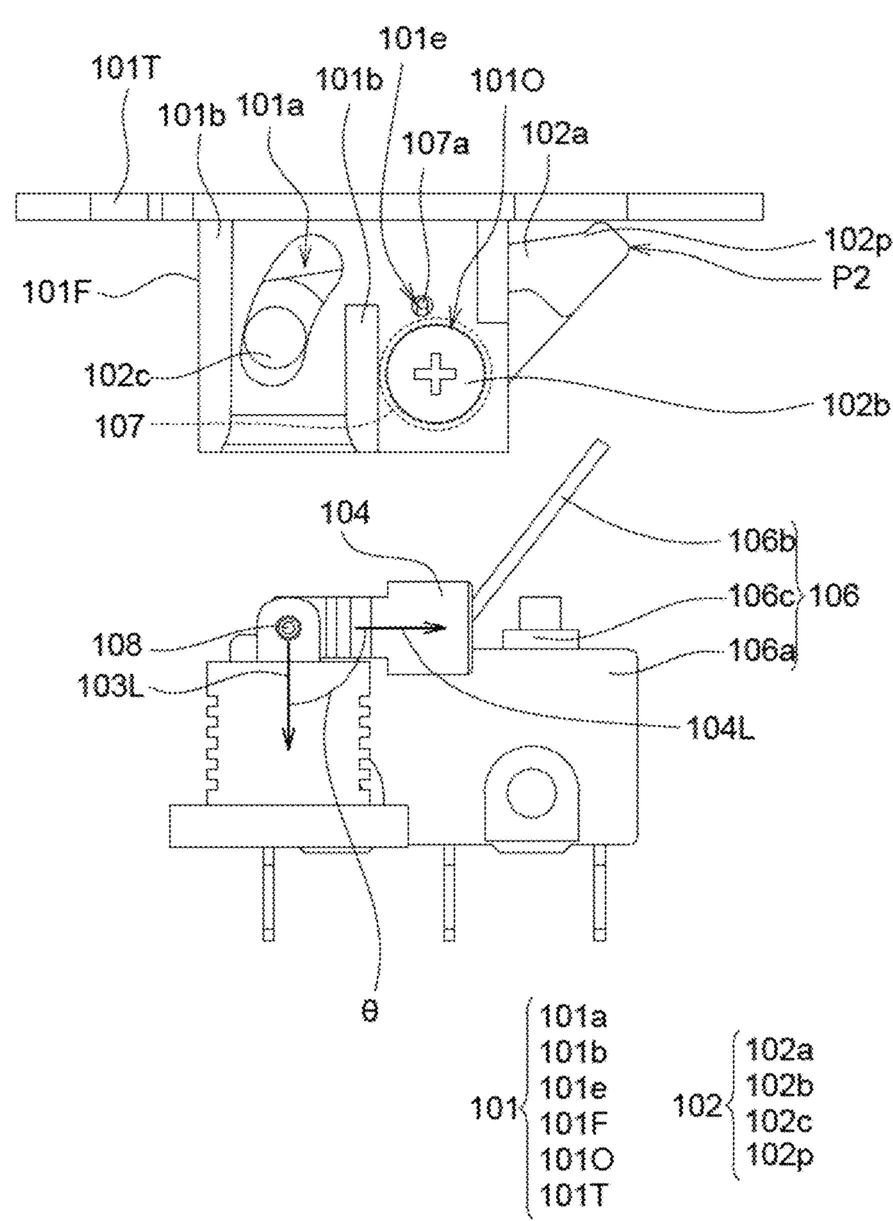
FIG. 1D is a side view of the anti-tamper device as depicted in FIG. 1A at the disassembly state after assembly.
Figure 1E:
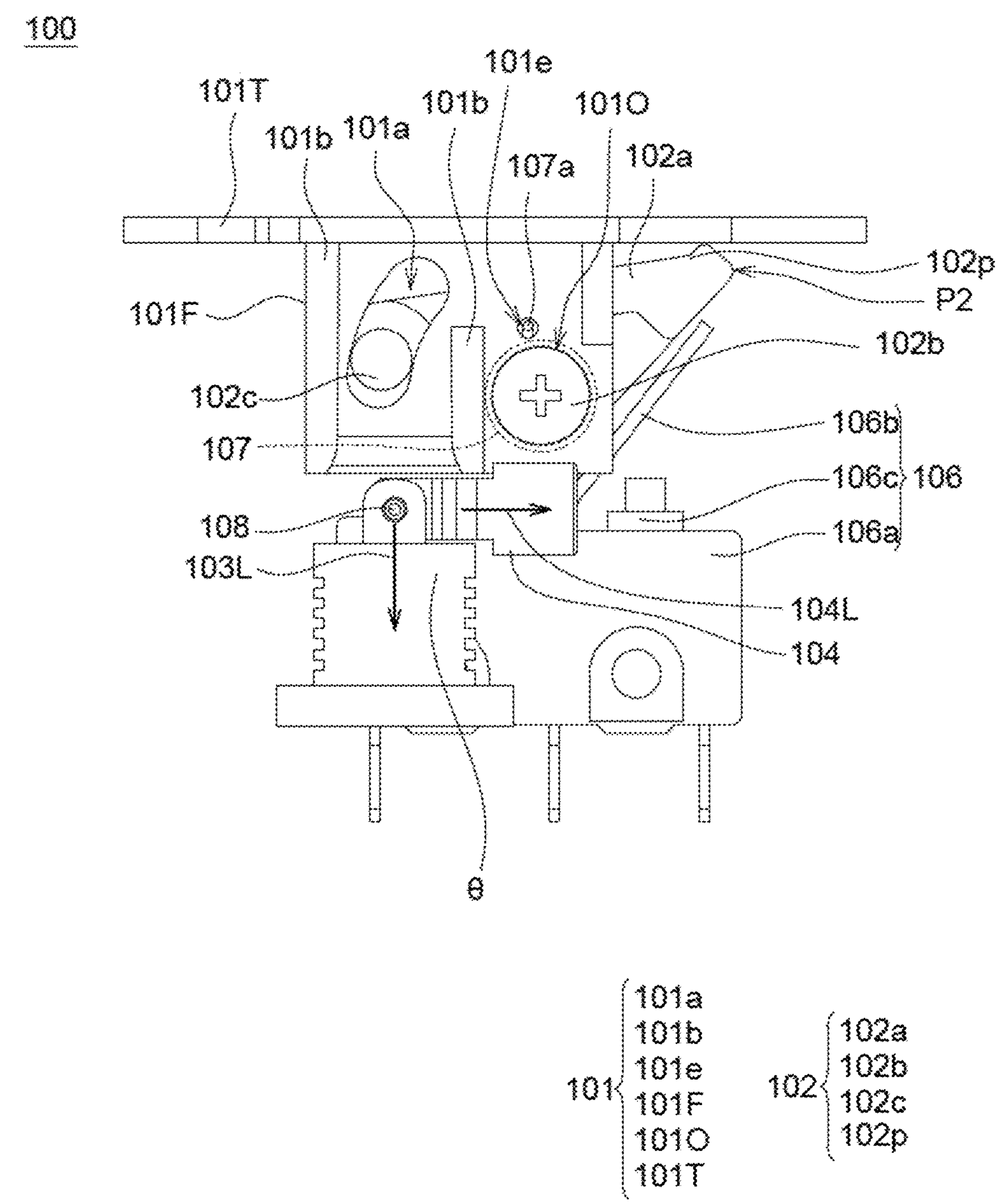
FIG. 1E is a side view of the anti-tamper device as depicted in FIG. 1A at the reassembly state after disassembly.

Referring to FIGS. 1A to 1E, FIG. 1A is perspective view illustrating the partial and exploded structure of an anti-tamper device 100 according to one embodiment of the present disclosure; FIG. 1B is a side view of the anti-tamper device 100 as depicted in FIG. 1A at the pre-assembly state (in which the circuit elements 106 are omitted); FIG. 1C is a side view of the anti-tamper device 100 as depicted in FIG. 1A at the complete assembly state; FIG. 1D is a side view of the anti-tamper device 100 as depicted in FIG. 1A at the disassembly state after assembly; and FIG. 1E is a side view of the anti-tamper device 100 as depicted in FIG. 1A at the reassembly state after disassembly. In the present embodiment, the anti-tamper device 100 includes a top component 101, a reciprocating component 102, a bottom component 103, a rotatable rod 104, a movable sleeve 105 and a circuit element 106.

Specifically, in the present embodiment, the top component 101 has a top plate 101T, a side plate 101F, a first guide portion 101*a* and a second guide portion 101*b*. The side plate 101F extends vertically outward from the edge of the top plate 101T. The first guide portion 101*a* is an arc-shaped groove passing through the side plate 101F. The second guide portion 101*b* includes two parallel ribs protruding from the side plate 101F to define a guide slot 101*r*. The width of the guide slot 101*r* is greater than or equal to the diameter of the rotatable rod 104. Such that, it allows the rotatable rod 104 being movably inserted into the guide slot 101*r* in such a manner that the axis 104L of the rotatable rod 104 is parallel to the two parallel ribs of the first guide portion 101*a*, so as to abut against and push a connecting rod 102*c* of the reciprocating component 102 (as shown in FIGS. 1A and 1B).

The reciprocating component 102 is pivotally connected to the top component 101. In the present embodiment, the reciprocating component 102 includes a body portion 102*a*, a pivot rod 102*b* protruding from the surface of the body portion 102*a*, a connecting rod 102*c* protruding from the surface of the body portion 102*a*, and a trigger portion 102P disposed at one side of the body portion 102*a*. The pivot rod 102*b* is inserted into a pivot hole 101O in the side plate 101F of the top component 101, so as to pivotally connect the reciprocating component 102 to the top component 101. The connecting rod 102*c* is inserted into the first guide portion 101*a* (arc groove) in the side plate 101F of the top component 101. The width of the first guide portion 101*a* (arc groove) is substantially greater than or equal to the diameter of the connecting rod 102*c*, so as to allow the connecting rod 102*c* to slide movably in the arc groove of the first guide portion 101*a* (as shown in FIG. 1B).

As shown in FIG. 1C, at least a portion of the arc-shaped groove of the first guiding portion 101*a* extends into the guiding slot 101*r* defined by the two parallel ribs of the second guiding portion 101*b*. When the rotatable rod 104 moves in the guide slot 101*r* of the second guide portion 101*b*, it can push the connecting rod 102*c* of the reciprocating component 102 to drive the body portion 102*a* to rotate around the pivot rod 102*b*. Therefore, the trigger portion 102P of the reciprocating component 102 can reciprocate (move) between the first position P1 and the second position P2.

In addition, the anti-tamper device 100 further includes an elastic member 107 which is set up between the top component 101 and the reciprocating component 102. For example, in the present embodiment, the elastic member 107 can be (but not limited to) a helical coil torsion spring, the helical coil portion of the helical coil torsion spring sheathes on the pivot rod 102*b*, and the two ends of the helical coil torsion spring are fixed to the top component 101 (e.g., in the fixing hole 101*e* of the side plate 101F) and the reciprocating component 102 by a pin (leg) 107*a* respectively. When the trigger portion 102P of the reciprocating component 102 is moved from the second position P2 to the first position P1, the elastic member 107 may be twisted to generate and store elastic potential energy (as shown in FIG. 1C). When the rotatable rod 104 no longer pushes the connecting rod 102*c* of the reciprocating component 102, the elastic potential energy stored in the elastic member 107 can be released, thereby driving the body portion 102*a* of the reciprocating component 102 to rotate and driving the trigger portion 102P to return to the second position P2 (as shown in FIG. 1D).

The bottom component 103 has a top plate 103T and a fixing rod 103F. The fixing rod 103F protrudes from the surface of the top plate 103T facing the top component 101 and corresponds to the second guide portion 101*b* of the top component 101. The rotatable rod 104 is pivotally connected to the top of the fixing rod 103F. In the present embodiment, the rotatable rod 104 includes a rod body 104*a* and a pole column 104*b* protruding from one end of the rod body 104*a*. The rod body 104*a* is pivotally connected to the bottom component 103 through a pivot 108 passing through the pole column 104*b* and the top end of the fixing rod 103F. The rod body 104*a* can be inserted into the guide slot 101*r* of the first guide portion 101*a* to abut and push the connecting rod 102*c* of the reciprocating component 102 (as shown in FIG. 1C).

In the present embodiment, since the lateral dimension of the rod body 104*a* of the rotatable rod 104 is substantially larger than that of the fixing rod 103F, thus the center of gravity of the rod body 104*a* is less likely to be aligned with the center of gravity of the fixing rod 103F. When the center axis 103L of the fixing rod 103F extends upward perpendicular to the ground, the rod body 104*a* can be easily affected by gravity and rotates (falls to the left or right), if there is no any other components to restrain or assist it, thereby causing (the center axis 104L of) the rotatable rod 104 and (the center axis 103L of) the fixing rod 103F to form a non-straight angle θ (a non-180° angle (e.g., 90°) as shown in FIG. 1D).

The movable sleeve 105 is a movable element that moves (e.g., slides) under the guidance of the fixing rod 103, thereby switching between different states, for example two different states: one is the state of that the movable sleeve completely sheathes on the fixing rod 103, and the other is the state of that the movable sleeve partially sheathes both on the fixing rod 103 and the rotatable rod 104.

In detail, when the movable sleeve 105 is subjected to force and moves along the central axis 103L of the fixing rod 103F toward the rotatable rod 104, it can partially sleeve both on the rod body 104*a* of the rotatable rod 104 and the fixing rod 103 at the same time. Since the fixing rod 103F and the rotatable rod 104 are both constrained by the movable sleeve 105, thus the fixing rod 103F of the fixing rod 103F and the central axis 104L of the rotatable rod 104 are coaxial (as shown in FIG. 1B).

In some embodiments of the present disclosure, the movable sleeve 105 may be made of an elastic material, which helps the movable sleeve 105 to tightly partially sleeve both on the rod body 104*a* of the rotatable rod 104 and the outer side of the fixing rod 103 at the same time, so that the central axis 103L of the fixing rod 103F and the central axis 104L of the rotatable rod 104 can remain coaxial. However, the material and structure of the movable sleeve 105 are not limited thereto.

Figure 2:
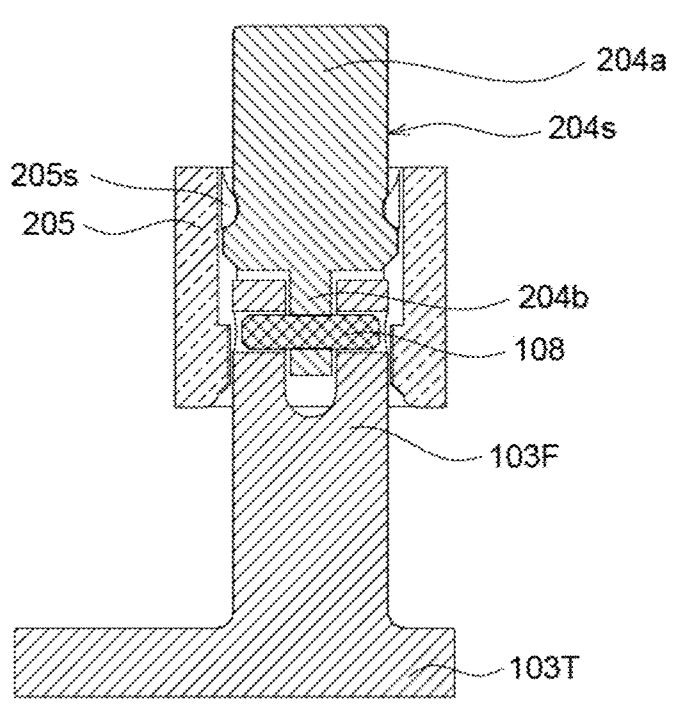
FIG. 2 is a cross-sectional view illustrating the partial structure of an anti-tamper device according to another embodiment of the present disclosure.

Referring to FIG. 2, FIG. 2 is a cross-sectional view illustrating the partial structure of an anti-tamper device 200 according to another embodiment of the present disclosure. In the present embodiment, the inner wall 205*s* of the movable sleeve 205 has at least one flange 205*a;* the outer side wall 204*s* of the rotatable rod 204 has at least one groove 204*r.* When the movable sleeve 205 partially sheathes both on the rotatable rod 204 and the fixing rod 103F at the same time, the flange 205*a* and the groove 204*r* can engage with each other to ensure that the movable sleeve 205 tightly partially sheath both on the rod body 204*a* of the rotatable rod 204 and the outer side of the fixing rod 103 at the same time, so that the central axis 103L of the fixing rod 103F and the central axis 204L of the rotatable rod 204 can remain coaxial.

Of note that, the positions of the flange 205*a* and the groove 204*r* can be swapped. For example, in another embodiment, the inner wall 205*s* of the movable sleeve 205 can have at least one groove (not shown); and the outer side wall 204*s* of the rotatable rod 204 can have at least one corresponding flange (not shown).

The circuit element 106 is adjacent to the bottom component 103 and includes a housing 106*a,* an electronic circuit (not shown), a pressing rod 106*b* and a pressing switch 106*c* (but is not limited to this regard). The electronic circuit (not shown) is disposed on a circuit board (not shown) disposed in the housing. The pressing rod 106*b* is pivotally connected to the housing 106*a* and extends outward to the vicinity of the first position P1 for contacting the trigger portion 102P of the reciprocating component 102. The pressing switch 106*c* is disposed outside the housing 106*a* and is electrically connected to the electronic circuit (not shown). When the trigger portion 102P of the reciprocating component 102 is forced to move and contact the pressing rod 106*b,* the trigger portion 102P will provide a stress to push the pressing rod 106*b* to rotate and press the pressing switch 106*c* to trigger the electronic circuit (not shown) to generate an electronic signal. When the trigger portion 102P of the reciprocating component 102 no longer provides stress to push the pressing rod 106*b,* the pressing rod 106*b* will release the pressing switch 106*c,* so that the electronic circuit (not shown) no longer generates electronic signal.

When the anti-tamper device 100 is applied to an electronic product/system or its peripheral device (not shown), the assembly method of the anti-tamper device 100 includes steps as follows: Firstly, the anti-tamper device 100 as described above is provided, and the top component 101 and the bottom component 103 (including the reciprocating component 102, the rotatable rod 104 pivotally connected to the bottom component 103, and the circuit element 106 adjacent to the bottom component 103) are respectively installed onto two detachable and assemblable structural parts (for example, an upper cover and a lower cover which is detachable and assemblable with each other) of the electronic product/system or its peripheral device (not shown). Then, the top component 101 and the bottom component 103 are correspondingly engaged.

Before correspondingly engaging the top component 101 with the bottom component 103, the movable sleeve 105 partially sheathes both on the fixing rod 103F and the rotatable rod 104 of the bottom component, to cause the central axis 103L of the fixing rod 103F and the central axis 104L of the rotatable rod 104 to be coaxial (as shown in FIG. 1B).

Afterwards, the rotatable rod 104 is movably inserted into the guide slot 101*r* to make the axis 104L of the rotatable rod 104 parallel to the two parallel ribs of the second guide portion 101*b,* so that the rotatable rod 104 is movably engaged with the second guide portion 101*b* of the top component 101 and abut the connecting rod 102*c* of the reciprocating component 102, thereby the top component 101 is correspondingly engaged with the bottom component 103 (as shown in FIG. 1C).

Due to the push of the rotatable rod 104, the connecting rod 102*c* passing through the arc groove of the first guide portion 101*a* of the top component 101 can drive the body portion 102*a* of the reciprocating component 102 to rotate, thereby driving the trigger portion 102P to move to the first position P1 to contact the pressing rod 106*b* of the circuit element 106. At the same time, a stress is provided to push the pressing rod 106*b* to rotate, and the pressing switch 106*c* is pressed to trigger the electronic circuit (not shown) to generate an electronic signal, which is then output to the electronic product/system or its peripheral device.

At the same time, the two parallel ribs of the second guide portion 101*b* of the top component 101 push the movable sleeve 105 toward the bottom component 103, so that the movable sleeve 105 can completely sheath on the fixing rod 103F. The rotating body potion 102*a* may stretch or push the elastic member 107 to cause it to generate and store elastic potential energy. As the circuit element 106 continues to output electronic signals, it indicates that (the upper cover and the lower cover of) the electronic product/system or its peripheral device has not been disassembled without authorization.

When (the upper cover and the lower cover of) the electronic product/system or its peripheral device is disassembled, as the top component 101 and the bottom component 103 are separated, the rod body 104*a* of the rotatable rod 104 is pulled out by the fixing rod 103F and disengaged from the guide slot 101*r* of the second guide portion 101*b*. In the absence of the restraint provided by the movable sleeve 105, the rod body 104*a* rotates (falls to the left or right) due to the influence of gravity, thereby causing (the central axis 104L of) the rotatable rod 104 to form a non-straight angle θ (non-180°) with (the center axis 103L of) the fixing rod 103F. At this time, since the rod body 104*a* of the rotatable rod 104 no longer pushes against the connecting rod 102*c* of the reciprocating component 102, the elastic potential energy stored in the elastic member 107 can be thus released, thereby driving the body portion 102*a* of the reciprocating component 102 to rotate in the opposite direction, and driving the trigger portion 102P to return to the second position P2 (as shown in FIG. 1D).

If the anti-tamper device 100 is reassembled in the above-mentioned assembly method by a technician who is not familiar with the anti-tamper device 100 after disassembly (as shown in FIG. 1E), since the trigger portion 102P of the reciprocating component 102 no longer pushes against the pressing rod 106*b* of the circuit element 106, the circuit element 106 will no longer be triggered to output electronic signal to the electronic product/system or its peripheral device. The electronic product/system or its peripheral device can send an alarm message accordingly to notify the owner of the electronic product/system or its peripheral device in real time that the electronic product/system or its peripheral device has been disassembled without authorization.

According to one embodiment of the present disclosure, an anti-tamper device and an assembly method thereof are provided, wherein the anti-tamper device includes a top component, a reciprocating component, a bottom component, a rotatable rod, a movable sleeve, and a circuit element. The top component has a first guide portion and a second guide portion. The bottom component includes a fixing rod. The rotatable rod is pivotally connected to the fixing rod. Before the top component is correspondingly engaged with the bottom component, the movable sleeve firstly sheathes both on the rotatable rod and the fixing rod to make the rotatable rod and the fixing rod coaxial. The rotatable rod is then movably engaged with the second guide portion of the upper component, to make the rotatable rod driving the reciprocating component moving to the first position and to trigger the circuit element generating an electronic signal. At this time, the movable sleeve is separate from the rotatable rod, due to the push of the second guiding portion, and completely sheathes on the fixing rod.

When the top component and the bottom component are disassembled and detached from each other, the rotatable rod is detached from the second guide portion. Since the rotatable rod is no longer restrained by the movable sleeve, thus it may rotate, due to gravity, and form a non-straight angle with the fixing rod. At this time, the rotatable rod no longer pushes the reciprocating component and trigger the circuit element to generate electronic signal. Meanwhile, the circuit element can generate an alarm signal to notify the owner of the electronic product/system that there occurs an unauthorized disassembly in real time. Because, reassembly of the anti-tamper device must be performed by professionals who understand the internal design of the anti-tamper device following a specific instructions of the professionals, it can ensure the electronic product/system not being disassembled, tampered with or read without authorization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An anti-tamper device, comprising:
- a top component, having a first guide portion and a second guide portion;
- a reciprocating component, configured for reciprocating between a first position and a second position;
- a bottom component, having a fixing rod corresponding to the second guide portion
- a rotatable rod, pivotally connected to the fixing rod
- a movable sleeve, and
- a circuit element;
- wherein when the movable sleeve partially sheathes both on the rotatable rod and the fixing rod, and the top component correspondingly is engaged with the bottom component, the rotatable rod is movably engaged with the second guide portion to drive the reciprocating component moving to the first position, so as to trigger the circuit element generating an electronic signal, and to drive the second guide portion pushing the movable sleeve to completely sheath on the fixing rod;
- when the top component is disassembled and detached from the bottom component, the rotatable rod is driven to rotate and to form a non-straight angle (non-180°) with the fixing rod, and no longer drives the reciprocating component to move, so as to keep the reciprocating component at the second position.

2. The anti-tamper device according to claim 1, wherein the first guide portion comprises an arc groove, and the reciprocating component comprises:
- a body portion,
- a pivot rod, protruding from the body portion and pivotally connected to the top component;
- a connecting rod, protruding from the body portion and inserted into the arc groove, and a trigger portion, disposed at one side of the body portion;
- wherein when the rotatable rod pushes the connecting rod sliding along the arc groove to drive the body portion to rotate, the trigger portion is driven to move to the first position and trigger the circuit element.

3. The anti-tamper device according to claim 2, wherein the second guide portion comprises two parallel ribs to define a guide slot allowing the rotatable rod being movably inserted into the guide slot to push the connecting rod.

4. The anti-tamper device according to claim 3, wherein the rotatable rod comprises:

a rod body, movably inserted into the guide slot; and a pole column, protruding from the rod body and pivotally connected to the fixing rod.

5. The anti-tamper device according to claim 2, further comprising:

an elastic member set up between the top component and the reciprocating component;

wherein when the reciprocating component is moved to the first position, the elastic member stores elastic potential energy; and when the rotatable rod no longer pushes the reciprocating component, the elastic potential energy is released to push the reciprocating component to return to the second position.

6. The anti-tamper device according to claim 5, wherein the elastic member is a helical coil torsion spring sheathes on the pivot rod, and two ends of the helical coil torsion spring are fixed to the top component and the reciprocating component.

7. The anti-tamper device according to claim 5, wherein the fixing rod has a first center axis, the rotatable rod has a second center axis; when the movable sleeve partially sheathes both on the rotatable rod and the fixing rod, the first center axis and the second center axis are coaxial; when the movable sleeve completely sheathes on the fixing rod, the first center axis and the second center axis form the non-straight angle (non-180°).

8. The anti-tamper device according to claim 1, wherein an inner wall of the movable sleeve has at least one flange/groove; an outer side wall of the rotatable rod has at least one groove/flange; when the movable sleeve partially sheathes both on the rotatable rod and the fixing rod, the at least one flange/groove engages with the at least one groove/flange.

9. The anti-tamper device according to claim 1, wherein the circuit element comprises:

a housing;

an electronic circuit, disposed in the housing;

a pressing rod, pivotally connected to the housing and extending outward to a vicinity of the first position for contacting a trigger portion; and a pressing switch, disposed outside the housing and electrically connected to the electronic circuit;

wherein when the reciprocating component contacts the pressing rod, a stress is provided to push the pressing rod to rotate and press the pressing switch to trigger the electronic circuit generating the electronic signal.

10. An anti-tamper device assembly method, comprising:

providing an anti-tamper device, comprising:

a top component, having a first guide portion and a second guide portion;

a reciprocating component, configured for reciprocating between a first position and a second position;

a bottom component, having a fixing rod corresponding to the second guide portion;

a rotatable rod, pivotally connected to the fixing rod;

a movable sleeve, and a circuit element; and engaging the top component correspondingly with the bottom component, comprising:

sheathing the movable sleeve both on the fixing rod and the rotatable rod; and movably engaging the rotatable rod with the second guide portion to make the rotatable rod driving the reciprocating component to move to the first position to trigger the circuit element generating an electronic signal; and to make the second guide portion pushing the movable sleeve to completely sheath on the fixing rod;

when the top component is disassembled and detached from the bottom component, the rotatable rod is driven to rotate and form a non-straight angle (non-180°) with the fixing rod, and no longer drives the reciprocating component to move, so as to keep the reciprocating component at the second position.

* * * * *